(12) United States Patent
Banerjee

(10) Patent No.: US 9,104,859 B1
(45) Date of Patent: Aug. 11, 2015

(54) SYSTEMS AND METHODS FOR SCANNING DATA STORED ON CLOUD COMPUTING PLATFORMS

(71) Applicant: Symantec Corporation, Mountain View, CA (US)

(72) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 136 days.

(21) Appl. No.: 13/925,357

(22) Filed: Jun. 24, 2013

(51) Int. Cl.
*H04L 29/06* (2006.01)
*G06F 21/00* (2013.01)
*G06F 21/50* (2013.01)

(52) U.S. Cl.
CPC ...................................... *G06F 21/50* (2013.01)

(58) Field of Classification Search
CPC ...................................................... G06F 21/50
See application file for complete search history.

(56) References Cited

U.S. PATENT DOCUMENTS

| 8,087,081 B1 * | 12/2011 | Chun et al. ...................... 726/22 |
| 8,856,927 B1 * | 10/2014 | Beloussov et al. ............... 726/23 |
| 2010/0154056 A1 * | 6/2010 | Smith et al. ...................... 726/22 |
| 2014/0337918 A1 * | 11/2014 | Siddiqi et al. ..................... 726/3 |

* cited by examiner

*Primary Examiner* — Lisa Lewis
(74) *Attorney, Agent, or Firm* — ALG Intellectual Property, LLC

(57) ABSTRACT

A computer-implemented method for scanning data stored on cloud computing platforms may include (1) identifying a cloud computing service that hosts a plurality of cloud computing instances and a plurality of data volumes that store data for the plurality of cloud computing instances, (2) determining that a data volume within the plurality of data volumes that stores data for a cloud computing instance within the plurality of cloud computing instances is subject to a security scan, (3) detecting a computing system that is external to the cloud computing instance, and (4) performing the security scan on the data volume from the computing system that is external to the cloud computing instance instead of performing the security scan from within the cloud computing instance. Various other methods, systems, and computer-readable media are also disclosed.

20 Claims, 6 Drawing Sheets

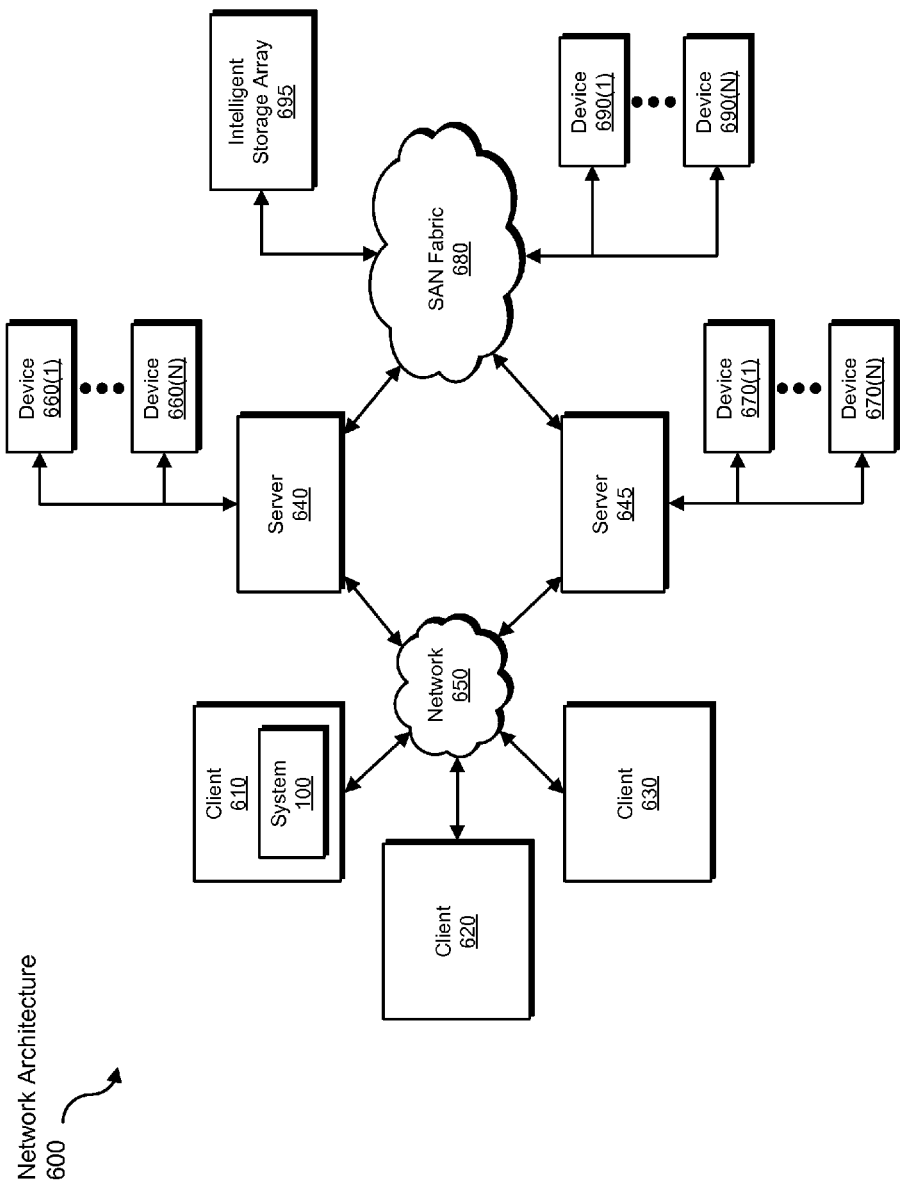

SYSTEMS AND METHODS FOR SCANNING DATA STORED ON CLOUD COMPUTING PLATFORMS

BACKGROUND

Organizations and consumers increasingly use cloud-based services to run applications and store data. Cloud-based computing services may provide a number of benefits to customers, including flexibility, reliability, low capitalization requirements, add-on services, data sharing, and centralized access to data. For example, organizations may quickly create or modify cloud-based computing instances on an as-needed basis to execute applications.

In order to ensure information security, many organizations install security systems on their computing systems to scan data stored by applications executing on those computing systems. Traditional approaches to cloud-based information security may often operate in a similar fashion. For example, organizations may deploy security software within their cloud-based computing instances to scan the cloud-stored data corresponding to each computing instance. Unfortunately, security scanning operations may often be computationally intensive, potentially creating a negative impact on the performance of primary applications executing within the computing instances.

Accordingly, the instant disclosure identifies and addresses a need for additional and improved systems and methods for scanning data stored on cloud computing platforms.

SUMMARY

As will be described in greater detail below, the instant disclosure generally relates to systems and methods for scanning data stored on cloud computing platforms by performing scans of data stored by cloud computing instances from computing systems external to the cloud computing instances.

In one example, a computer-implemented method for scanning data stored on cloud computing platforms may include (1) identifying a cloud computing service that hosts (i) a plurality of cloud computing instances and (ii) a plurality of data volumes that store data for the plurality of cloud computing instances, (2) determining that a data volume within the plurality of data volumes that stores data for a cloud computing instance within the plurality of cloud computing instances is subject to a security scan, (3) detecting a computing system that is external to the cloud computing instance, and (4) performing the security scan on the data volume from the computing system that is external to the cloud computing instance instead of performing the security scan from within the cloud computing instance.

In one embodiment, the computer-implemented method may further include retrieving, from the cloud computing service, information identifying changed data on the data volume that has changed since a previous security scan. In this embodiment, performing the security scan on the data volume may include performing the security scan on the changed data based on having identified that the changed data has changed since the previous security scan.

In some examples, the computer-implemented method may further include identifying an owner of the cloud computing instance. In these examples, performing the security scan on the data volume may include selecting data within the data volume to scan based on the owner of the cloud computing instance. Additionally or alternatively, performing the security scan on the data volume may include prioritizing the security scan on the data volume over a security scan on an additional data volume within the plurality of data volumes based on the owner of the cloud computing instance.

In some examples, the computer-implemented method may further include identifying an owner of the data volume. In these examples, performing the security scan on the data volume may include selecting data within the data volume to scan based on the owner of the data volume. Additionally or alternatively, performing the security scan on the data volume may include prioritizing the security scan on the data volume over a security scan on an additional data volume within the plurality of data volumes based on the owner of the data volume.

In some examples, performing the security scan on the data volume from the computing system that is external to the cloud computing instance may include performing the security scan on the data volume from the computing system externally to the cloud computing service.

In some examples, performing the security scan on the data volume from the computing system that is external to the cloud computing instance may include performing the security scan using a processor device and a memory device that are unavailable to the cloud computing instance.

In some examples, the computer-implemented method may further include taking a snapshot of the data volume. In these examples, performing the security scan on the data volume may include performing the security scan on the snapshot of the data volume.

In one embodiment, a system for implementing the above-described method may include (1) an identification module that identifies a cloud computing service that hosts (i) a plurality of cloud computing instances and (ii) a plurality of data volumes that store data for the plurality of cloud computing instances, (2) a determination module that determines that a data volume within the plurality of data volumes that stores data for a cloud computing instance within the plurality of cloud computing instances is subject to a security scan, (3) a detection module that detects a computing system that is external to the cloud computing instance, (4) a performing module that performs the security scan on the data volume from the computing system that is external to the cloud computing instance instead of performing the security scan from within the cloud computing instance, and (5) at least one processor configured to execute the identification module, the determination module, the detection module, and the performing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a cloud computing service that hosts (i) a plurality of cloud computing instances and (ii) a plurality of data volumes that store data for the plurality of cloud computing instances, (2) determine that a data volume within the plurality of data volumes that stores data for a cloud computing instance within the plurality of cloud computing instances is subject to a security scan, (3) detect a computing system that is external to the cloud computing instance, and (4) perform the security scan on the data volume from the computing system that is external to the cloud computing instance instead of performing the security scan from within the cloud computing instance.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary computing network capable of implementing one or more of the embodiments described and/or illustrated herein.

Figure 1:
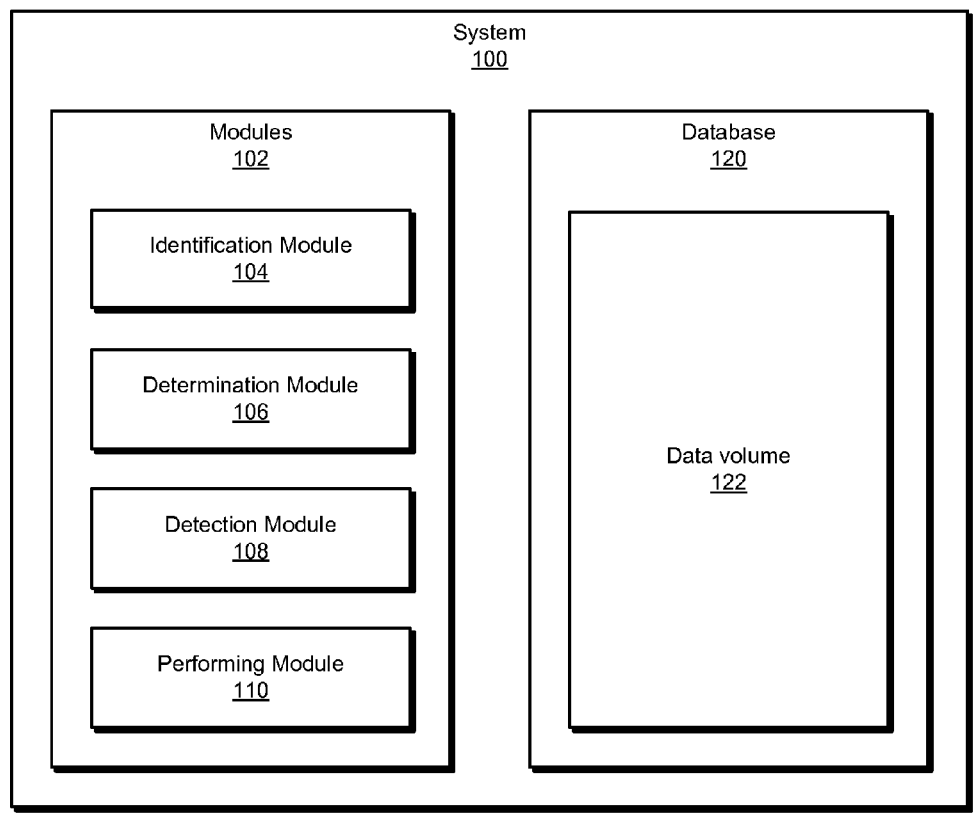
FIG. 1 is a block diagram of an exemplary system for scanning data stored on cloud computing platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for scanning data stored on cloud computing platforms. As will be explained in greater detail below, by performing scans of data stored by cloud computing instances from computing systems external to the cloud computing instances, the systems and methods described herein may facilitate information security for cloud computing instances consuming computing resources used by and/or allocated for the cloud computing instances. In this manner, the performance of primary applications within cloud computing instances may suffer minimal to no impact from security scans.

Figure 2:
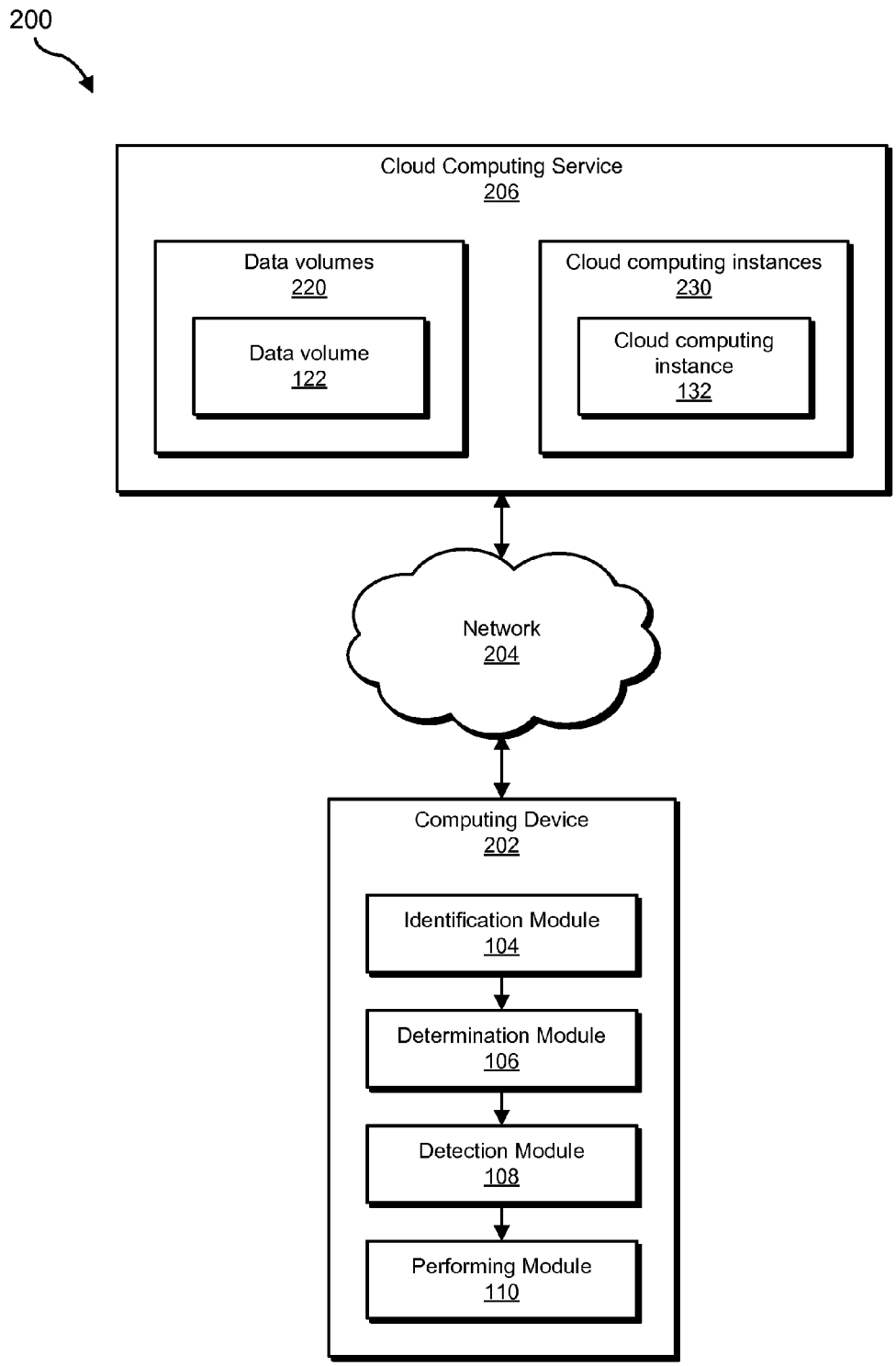
FIG. 2 is a block diagram of an exemplary system for scanning data stored on cloud computing platforms.
Figure 3:
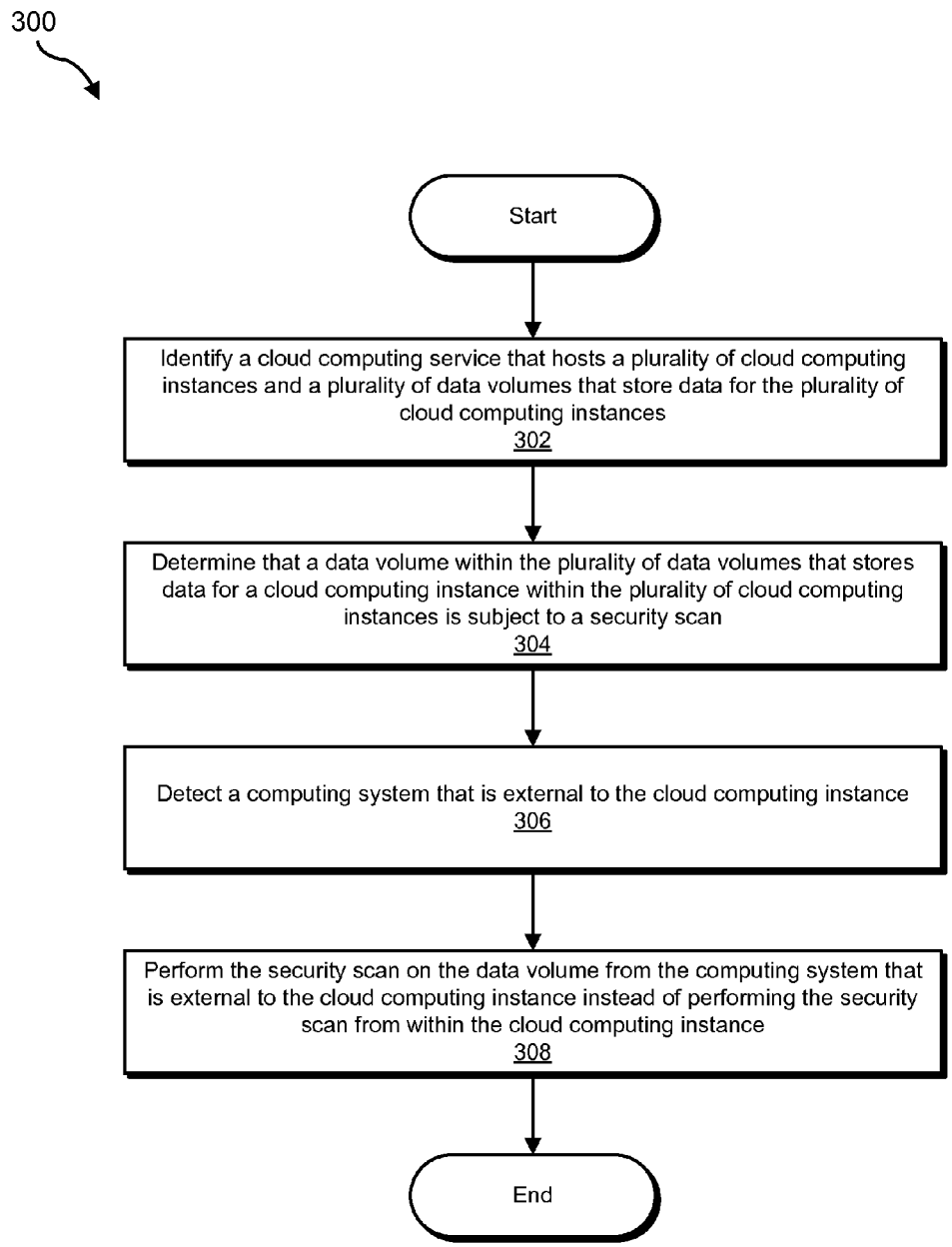
FIG. 3 is a flow diagram of an exemplary method for scanning data stored on cloud computing platforms.
Figure 4:
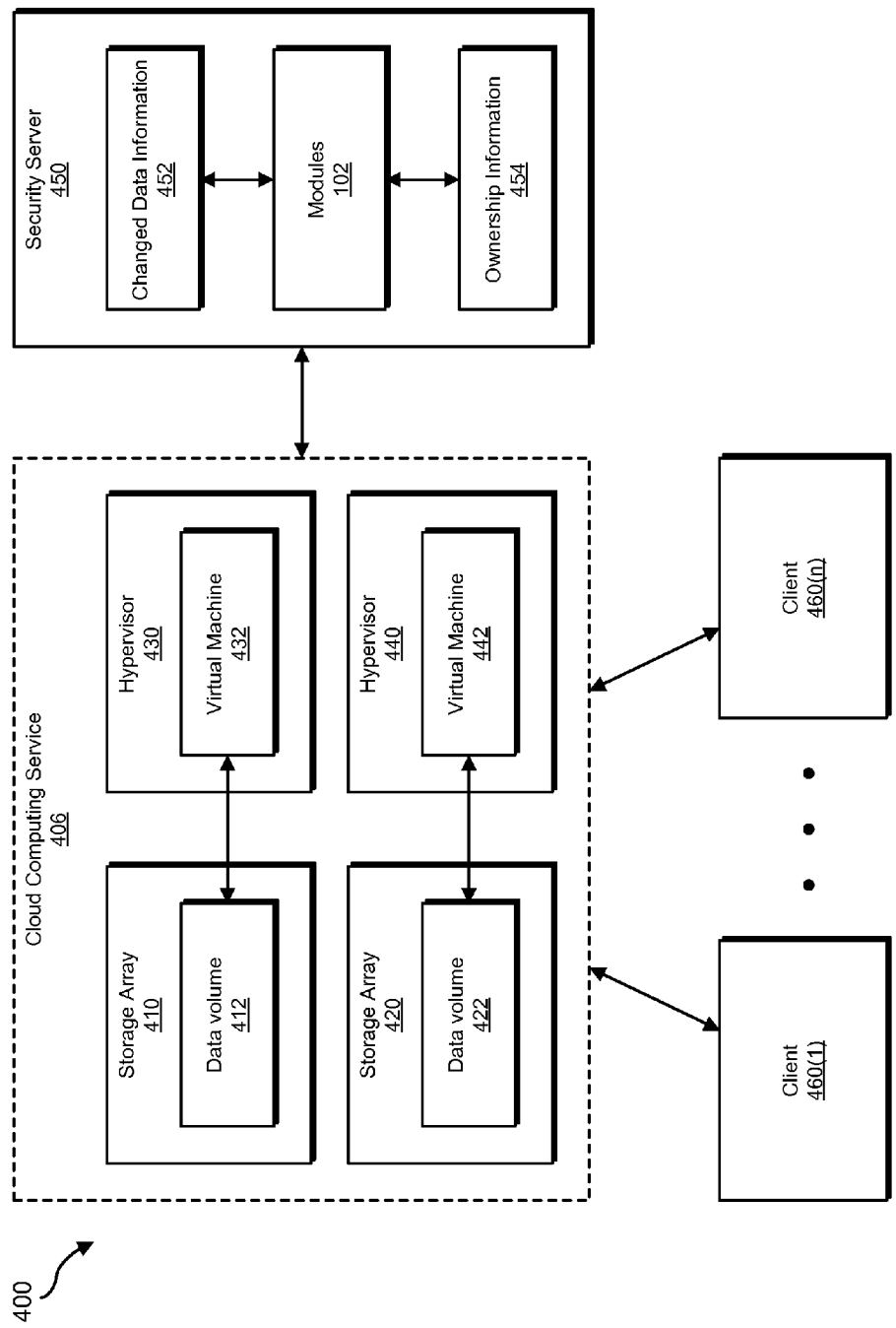
FIG. 4 is a block diagram of an exemplary system for scanning data stored on cloud computing platforms.

The following will provide, with reference to FIGS. 1, 2, and 4, detailed descriptions of exemplary systems for scanning data stored on cloud computing platforms. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for scanning data stored on cloud computing platforms. As illustrated in this figure, exemplary system 100 may include one or more modules 102 for performing one or more tasks. For example, and as will be explained in greater detail below, exemplary system 100 may also include an identification module 104 that may identify a cloud computing service that hosts a plurality of cloud computing instances and a plurality of data volumes that store data for the plurality of cloud computing instances. Exemplary system 100 may additionally include a determination module 106 that may determine that a data volume within the plurality of data volumes that stores data for a cloud computing instance within the plurality of cloud computing instances may be subject to a security scan. Exemplary system 100 may also include a detection module 108 that may detect a computing system that may be external to the cloud computing instance. Exemplary system 100 may additionally include a performing module 110 that may perform the security scan on the data volume from the computing system that may be external to the cloud computing instance instead of performing the security scan from within the cloud computing instance. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data for one or more applications executing within one or more cloud computing instances. For example, database 120 may store a data volume 122.

Database 120 may represent portions of a single database or computing device or a plurality of databases or computing devices. For example, database 120 may represent a portion of cloud computing service 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as a computing device underlying cloud computing service 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a cloud computing service 206 via a network 204. Computing device 202 may be programmed with one or more of modules 102. Additionally or alternatively, cloud computing service 206 may be programmed with one or more of modules 102 and/or may store all or a portion of the data in database 120.

In one embodiment, one or more of modules 102 from FIG. 1 may, when executed by at least one processor of computing device 202 and/or cloud computing service 206, facilitate computing device 202 and/or cloud computing service 206 in scanning data stored on cloud computing platforms. For example, and as will be described in greater detail below, one or more of modules 102 may cause computing device 202 and/or cloud computing service 206 to scan data stored on cloud computing platforms. For example, and as will be described in greater detail below, identification module 104 may be programmed to identify cloud computing service 206 that hosts cloud computing instances 230 and data volumes 220 that store data for cloud computing instances 230. Determination module 106 may be programmed to determine that a data volume 122 within data volumes 220 that stores data for a cloud computing instance 132 within cloud computing instances 230 is subject to a security scan. Detection module 108 may be programmed to detect computing device 202 that is external to cloud computing instance 132. Performing module 110 may be programmed to perform the security scan on data volume 122 from computing device 202 that is external to cloud computing instance 132 instead of performing the security scan from within cloud computing instance 132.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Cloud computing service 206 generally represents any type or form of computing system that is capable of providing online hosting of applications and/or storage. Examples of cloud computing service 206 include, without limitation, Software-as-a-Service ("SaaS") systems and Infrastructure-as-a-Service ("IaaS") systems. In some examples, cloud computing service 206 may provide one or more clients with a view of applications and data without providing the client complete access to all underlying systems.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and cloud computing service 206.

FIG. 3 is a flow diagram of an exemplary computer-implemented method 300 for scanning data stored on cloud computing platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a cloud computing service that hosts a plurality of cloud computing instances and a plurality of data volumes that store data for the plurality of cloud computing instances. For example, at step 302 identification module 104 may, as part of computing device 202 in FIG. 2, identify cloud computing service 206 that hosts cloud computing instances 230 and data volumes 220 that store data for cloud computing instances 230.

As used herein, the phrase "cloud computing service" may refer to any service, platform, and/or infrastructure that is capable of providing online and/or third-party hosting for applications and/or storage. Examples of cloud computing services include, without limitation, Software-as-a-Service ("SaaS") systems and Infrastructure-as-a-Service ("IaaS") systems. In some examples, a cloud computing service may provide one or more clients with a view of applications and data without providing the client complete access to all underlying systems. For example, a cloud computing service may allow a consumer to specify service requirements and/or resource requirements for one or more applications and/or virtual machines without requiring and/or allowing the consumer to control the underlying hardware resources. Examples of cloud computing services may include, without limitation, VMWARE VSPHERE, AMAZON WEB SERVICES, AMAZON S3, and BOX.NET BOX PLATFORM.

As used herein, the phrase "cloud computing instance" may refer to any unit of computational resources that may be provided by a cloud computing service and that may store data on the cloud computing service. In some examples, the phrase "cloud computing instance" may correspond to a virtual machine provisioned within the cloud computing service (e.g., onto which a user may install one or more applications that may store data on the cloud computing service). As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer. Examples of cloud computing instances include, without limitation, AMAZON ELASTIC COMPUTE CLOUD ("EC2") instances and VMWARE VCENTER virtual machines.

As used herein, the phrase "data volume" may refer to any distinctly identifiable collection of data that may be stored via a cloud computing service. In some examples, the volume may correspond to a logical storage unit used by a file system to store one or more files. In some examples, the term "data volume" may refer to an addressable storage space capable of storing files. In some examples, the phrase "data volume" may refer to a virtual disk and/or a virtualized storage layer. Examples of data volumes include, without limitation, AMAZON ELASTIC BLOCK STORE ("EBS") volumes and VMWARE virtual volumes.

Identification module 104 may identify the cloud computing service in any of a variety of ways. For example, identification module 104 may identify the cloud computing service by identifying and/or using an application programming interface for communicating with the cloud computing service. In some examples, identification module 104 may identify the cloud computing service by identifying one or more cloud computing instances hosted within the cloud computing service. Additionally or alternatively, identification module 104 may identify the cloud computing service by identifying one or more data volumes hosted within the cloud computing service.

FIG. 4 is a block diagram of an exemplary computing system 400 for scanning data stored on cloud computing platforms. As shown in FIG. 4, computing system 400 may include a cloud computing service 406 (e.g., that hosts applications and data consumable by clients 460(1)-(n)) and a security server 450. Cloud computing service 406 may include a hypervisor hosting a virtual machine 432, a hypervisor 440 hosting a virtual machine 442, a storage array 410 storing a data volume 412, and a storage array 420 storing a data volume 422. Using FIG. 4 as an example, identification module 104 may, as a part of security server 450, identify cloud computing service 406. For example, identification module 104 may identify cloud computing service 406 by using an application programming interface to communicate with cloud computing service 406 and/or by identifying virtual machine 432 and/or data volume 412 within cloud computing service 406.

Returning to FIG. 3, at step 304 one or more of the systems described herein may determine that a data volume within the plurality of data volumes that stores data for a cloud computing instance within the plurality of cloud computing instances is subject to a security scan. For example, at step 304 determination module 106 may, as part of computing device 202 in FIG. 2, determine that data volume 122 that stores data for cloud computing instance 132 is subject to a security scan. As used herein, the phrase "security scan" may refer to any suitable security assessment, analysis, and/or scan of stored data. For example, the security scan may include a malware scan to identify potentially malicious files within a volume of data (e.g., by performing a signature-based scan on the files and/or a static analysis of the files). As another example, the security scan may include a data loss prevention scan. As used herein, the phrase "data loss prevention" may refer to a technique for protecting sensitive information by applying one or more policies, rules, and/or heuristics to data within the bounds of a system to determine the disposition of the data in various scenarios. In some examples, a data loss prevention scan may locate potentially sensitive information within a data volume. Additionally or alternatively, the data loss prevention scan may determine that sensitive information is insecurely stored and/or may tag data with one or more categories that are consumable by data loss prevention policies. These data loss prevention policies may prohibit data from being used and/or transmitted in specified scenarios.

Determination module 106 may determine that the data volume is subject to a security scan in any of a variety of ways. For example, determination module 106 may determine that the data volume is subject to a security scan based on an owner of the data volume. Additionally or alternatively, determination module 106 may determine that the data volume is subject to a security scan based on an owner of the cloud computing instance that uses the data volume. In some examples, determination module 106 may determine that the data volume is subject to a security scan based on a security policy that identifies the data volume.

Using FIG. 4 as an example, at step 304 determination module 106 may determine that data volume 412 is subject to a security scan. For example, determination module 106 may determine that data volume 412 is subject to a security scan based on a security policy that specifies data volume 412.

Returning to FIG. 3, at step 306 one or more of the systems described herein may detect a computing system that is external to the cloud computing instance. For example, at step 306 detection module 108 may, as part of computing device 202 in FIG. 2, detect computing device 202 that is external to cloud computing instance 132.

Detection module 108 may detect the computing system external to the cloud computing instance in any suitable manner. For example, detection module 108 may identify a list of security servers capable of performing scans on cloud-stored volumes and select the computing system from the list. In another example, the detection module 108 may execute on the computing system external to the cloud computing instance. In this example, detection module 108 may detect the computing system external to the cloud computing instance by executing on the computing system.

By using a computing system external to the cloud computing instance to perform the security scan, the systems and methods described may avoid an impact on the performance of the cloud computing instance. In some examples, the computing system may perform the security scan using a processor and/or volatile memory resources that are not allocated for, relied upon, and/or available to the cloud computing instance. For example, the cloud computing instance may rely on one or more computing devices that make up the infrastructure of the cloud computing service, whereas the computing system external to the cloud computing instance may operate entirely outside and independent of the cloud computing service.

Using FIG. 4 as an example, at step 306 detection module 108 may detect security server 450 as a computing system external to virtual machine 432 from which to scan data volume 412.

Returning to FIG. 3, at step 308 one or more of the systems described herein may perform the security scan on the data volume from the computing system that is external to the cloud computing instance instead of performing the security scan from within the cloud computing instance. For example, at step 308 performing module 110 may, as part of computing device 202 in FIG. 2, perform the security scan on data volume 122 from the computing system that is external to cloud computing instance 132 instead of performing the security scan from within cloud computing instance 132.

Performing module 110 may perform the security scan on the data volume in any of a variety of ways. For example, performing module 110 may perform the security scan on the data volume on a periodic basis. In some examples, performing module 110 may limit the security scan to a portion of the data volume. For example, performing module 110 may retrieve, from the cloud computing service, information identifying changed data on the data volume that has changed since a previous security scan. In this example, performing module 110 may perform the security scan on the changed data (and, e.g., not on the unchanged data). Performing module 110 may retrieve the information about the changed data from the cloud computing service in any suitable manner. For example, performing module 110 may query the cloud computing service via an application programming interface to retrieve a list of changed files and/or blocks. Additionally or alternatively, performing module 110 may retrieve one or activity logs generated by the cloud computing service that identify changed files.

In some examples, performing module 110 may take a snapshot of the data volume (or identify a snapshot of the data volume taken by another system, such as the cloud computing service). In these examples, performing module 110 may perform the security scan on the data volume by performing the security scan on the snapshot of the volume. Additionally, in some examples performing module 110 may create an incremental snapshot of the data volume that tracks changed blocks and/or files. Accordingly, performing module 110 may perform the security scan on the changed data as identified from the incremental snapshot of the data volume.

In some examples, performing module 110 may define the scope of the security scan based on information about an owner of the data volume and/or an owner of the computing instance. For example, performing module 110 may identify an owner of the cloud computing instance and select data within the volume to scan based on the owner of the cloud computing instance. Additionally or alternatively, performing module 110 may identify an owner of the data volume and select data within the volume to scan based on the owner of the data volume. For example, performing module 110 may configure a data loss prevention policy to apply to the data volume based on what data an owner of the computing instance and/or data volume is expected to store and/or is allowed to store. For example, performing module 110 may determine that a chief financial officer of an organization owns the computing instance. In this example, performing module 110 may include policies that are directed to protecting financial data in the security scan of the corresponding data volume. In this manner, performing module 110 may avoid unnecessarily analyzing every piece of available data under every available security policy. For example, performing module 110 may perform differentiated scans on multiple data volumes within the cloud computing service based on the ownership of the data volumes and/or their corresponding cloud computing instances.

In some examples, performing module 110 may prioritize one or more security scans between one or more data volumes within the cloud computing service based on the ownership of the data volumes and/or their corresponding cloud computing instances. For example, performing module 110 may perform earlier, more frequent, and/or more intensive security scans on data volumes owned by high-priority users who are tagged as more likely to store important and/or sensitive data.

Performing module 110 may identify an owner of a data volume and/or a cloud computing instance in any suitable manner. For example, performing module 110 may identify a user account with rights to configure and/or access the data volume and/or cloud computing instance. In some examples, performing module 110 may identify information that indicates what users have accessed and/or changed data on the data volume most frequently and/or recently, and infer ownership of the data volume based on the information.

In some examples, performing module 110 may perform the security scan using a processor device and a memory device that are unavailable to the cloud computing instance. In this manner, performing module 110 may avoid competing for computing resources with the cloud computing instance.

Using FIG. 4 as an example, at step 308 performing module 110 may perform a security scan on data volume 412. In some examples, performing module 110 may determine the scope of the security scan based on changed data information 452 that identifies which data in data volume 412 has changed since a previous security scan. Additionally or alternatively, performing module 110 may determine the scope of the security scan based on ownership information 454 that identifies an owner of data volume 412 and/or virtual machine 432. In some examples, performing module 110 may apply different security policies to data volumes 412 and 422 based on differing ownership information between data volumes 412 and 422 and/or between virtual machines 432 and 442. After step 308, method 300 may terminate.

As described above, by performing scans of data stored by cloud computing instances from computing systems external to the cloud computing instances, the systems and methods described herein may facilitate information security for cloud computing instances consuming computing resources used by and/or allocated for the cloud computing instances. In this manner, the performance of primary applications within cloud computing instances may suffer minimal to no impact from security scans. Furthermore, in some examples these systems and methods may limit security scans to changed data identified via the cloud computing service and/or may intelligently match security policies with data based on ownership information of the data volumes and/or cloud computing instances.

In one example, a scanning engine (e.g., a data loss prevention engine and/or an anti-malware engine) may be hosted on a server separate from and external to cloud computing instances. The scanning engine may implement offline scans that run periodically to scan for sensitive content and/or malware in cloud-based computing platforms. Using AMAZON WEB SERVICES ("AWS") as an example, the systems described herein may identify the set of EC2 instances and their attached EBS volumes by using application programming interfaces for the AWS management console. The systems described herein may also identify additional context about the instances, such as who started the instances and/or created the volumes. The systems described herein may then take snapshots (e.g., incremental snapshots) of the EBS volumes. Using the snapshots in combination with change block tracking and/or change file tracking, the systems described herein may identify the set of files that have changed (e.g., since a previous security scan). The scanning engine may then restrict the scope of a scan to the changed files only. Additionally or alternatively, the scanning engine may use the additional context about the ownership of the instances and/or volumes to determine the scope of the scan.

Using VMWARE-based cloud platforms as an example, the VSTORAGE application programming interface for data protection may offer change list tracking. Additionally or alternatively, storage systems may include native capabilities to identify changed blocks. Accordingly, the systems described herein may use one or more change-tracking techniques to scan only changed files. This information may be used in combination with additional context (e.g., about ownership of the data volumes and/or instances) to prioritize the application of security policies and/or to determine the extent of applicable policies and rules to the various data volumes within a cloud storage service.

Figure 5:
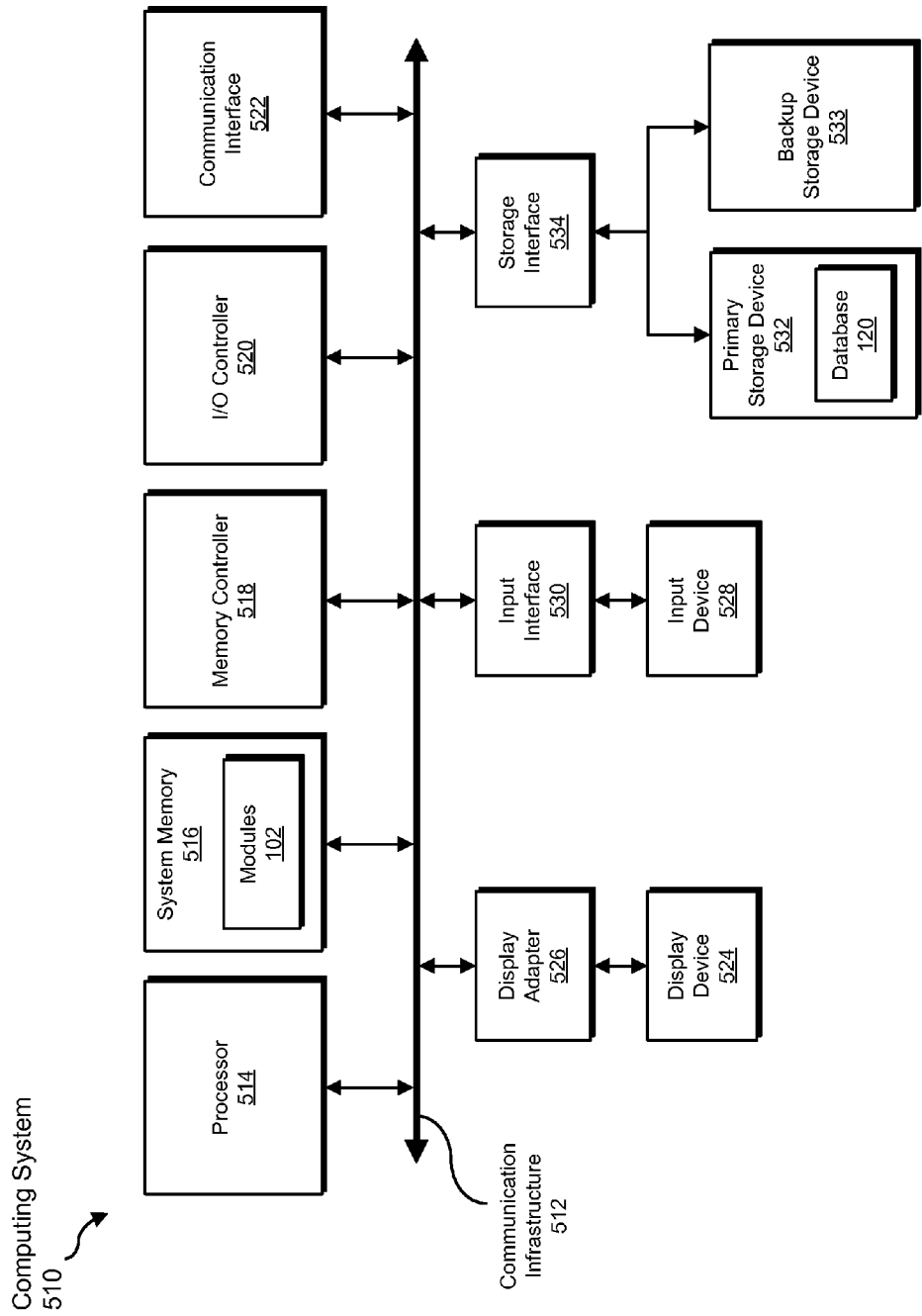
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for scanning data stored on cloud computing platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data from a cloud-based data volume to be transformed, transform the data into a security assessment of the data, output a result of the transformation to a security log, use the result of the transformation to remove data from the data volume, and store the result of the transformation on a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for scanning data stored on cloud computing platforms,
   at least a portion of the method being performed by a computing device comprising at least one processor, the method comprising:

identifying a cloud computing service that hosts a plurality of cloud computing instances and a plurality of data volumes that store data for the plurality of cloud computing instances;

determining that a data volume within the plurality of data volumes that stores data for a cloud computing instance within the plurality of cloud computing instances is subject to a security scan;

identifying at least one of an owner of the data volume and an owner of the cloud computing instance;

prioritizing the security scan on the data volume over a security scan on an additional data volume within the plurality of data volumes based on at least one of the owner of the data volume and the owner of the cloud computing instance;

detecting a computing system that is external to the cloud computing instance;

performing, based on the prioritization of the security scan on the data volume over the security scan on the additional data volume, the security scan on the data volume from the computing system that is external to the cloud computing instance instead of performing the security scan from within the cloud computing instance.

2. The computer-implemented method of claim 1, further comprising retrieving, from the cloud computing service, information identifying changed data on the data volume that has changed since a previous security scan;

wherein performing the security scan on the data volume comprises performing the security scan on the changed data based on having identified that the changed data has changed since the previous security scan.

3. The computer-implemented method of claim 1, wherein performing the security scan on the data volume comprises selecting data within the data volume to scan based on the owner of the cloud computing instance.

4. The computer-implemented method of claim 1, wherein performing the security scan on the data volume comprises selecting data within the data volume to scan based on the owner of the data volume.

5. The computer-implemented method of claim 1, wherein performing the security scan on the data volume from the computing system that is external to the cloud computing instance comprises performing the security scan on the data volume from the computing system externally to the cloud computing service.

6. The computer-implemented method of claim 1, wherein performing the security scan on the data volume from the computing system that is external to the cloud computing instance comprises performing the security scan using a processor device and a memory device that are unavailable to the cloud computing instance.

7. The computer-implemented method of claim 1, further comprising taking a snapshot of the data volume;

wherein performing the security scan on the data volume comprises performing the security scan on the snapshot of the data volume.

8. A system for scanning data stored on cloud computing platforms, the system comprising:

an identification module that identifies a cloud computing service that hosts:
 a plurality of cloud computing instances;
 a plurality of data volumes that store data for the plurality of cloud computing instances;

a determination module that determines that a data volume within the plurality of data volumes that stores data for a cloud computing instance within the plurality of cloud computing instances is subject to a security scan;

an ownership module that identifies at least one of an owner of the data volume and an owner of the cloud computing instance;

a prioritization module that prioritizes the security scan on the data volume over a security scan on an additional data volume within the plurality of data volumes based on at least one of the owner of the data volume and the owner of the cloud computing instance;

a detection module that detects a computing system that is external to the cloud computing instance;

a performing module that performs, based on the prioritization of the security scan on the data volume over the security scan on the additional data volume, the security scan on the data volume from the computing system that is external to the cloud computing instance instead of performing the security scan from within the cloud computing instance;

at least one processor configured to execute the identification module, the determination module, the ownership module, the prioritization module, the detection module, and the performing module.

9. The system of claim 8, wherein:

the performing module also retrieves, from the cloud computing service, information identifying changed data on the data volume that has changed since a previous security scan;

the performing module performs the security scan on the data volume by performing the security scan on the changed data based on having identified that the changed data has changed since the previous security scan.

10. The system of claim 8, wherein the performing module performs the security scan on the data volume by selecting data within the data volume to scan based on the owner of the cloud computing instance.

11. The system of claim 8, wherein the performing module performs the security scan on the data volume by selecting data within the data volume to scan based on the owner of the data volume.

12. The system of claim 8, wherein the performing module performs the security scan on the data volume from the computing system that is external to the cloud computing instance by performing the security scan on the data volume from the computing system externally to the cloud computing service.

13. The system of claim 8, wherein the performing module performs the security scan on the data volume from the computing system that is external to the cloud computing instance by performing the security scan using a processor device and a memory device that are unavailable to the cloud computing instance.

14. The system of claim 8, wherein:

the performing module also takes a snapshot of the data volume;

the performing module performs the security scan on the data volume by performing the security scan on the snapshot of the data volume.

15. A non-transitory computer-readable-storage medium comprising one or more computer-readable instructions that, when executed by at least one processor of a computing device, cause the computing device to:

identify a cloud computing service that hosts a plurality of cloud computing instances and a plurality of data volumes that store data for the plurality of cloud computing instances;

determine that a data volume within the plurality of data volumes that stores data for a cloud computing instance within the plurality of cloud computing instances is subject to a security scan;

identify at least one of an owner of the data volume and an owner of the cloud computing instance;

prioritize the security scan on the data volume over a security scan on an additional data volume within the plurality of data volumes based on at least one of the owner of the data volume and the owner of the cloud computing instance;

detect a computing system that is external to the cloud computing instance;

perform, based on the prioritization of the security scan on the data volume over the security scan on the additional volume, the security scan on the data volume from the computing system that is external to the cloud computing instance instead of performing the security scan from within the cloud computing instance.

16. The non-transitory computer-readable-storage medium of claim 15, wherein the one or more computer-readable instructions further cause the computing device to:

retrieve, from the cloud computing service, information identifying changed data on the data volume that has changed since a previous security scan;

perform the security scan on the changed data based on having identified that the changed data has changed since the previous security scan.

17. The non-transitory computer-readable-storage medium of claim 15, wherein the one or more computer-readable instructions cause the computing device to perform the security scan on the data volume by selecting data within the data volume to scan based on the owner of the cloud computing instance.

18. The non-transitory computer-readable-storage medium of claim 15, wherein the one or more computer-readable instructions cause the computing device to perform the security scan on the data volume by selecting data within the data volume to scan based on the owner of the data volume.

19. The non-transitory computer-readable-storage medium of claim 15, wherein the one or more computer-readable instructions cause the computing device to perform the security scan on the data volume from the computing system that is external to the cloud computing instance by performing the security scan on the data volume from the computing system externally to the cloud computing service.

20. The non-transitory computer-readable-storage medium of claim 15, wherein the one or more computer-readable instructions cause the computing device to perform the security scan on the data volume from the computing system that is external to the cloud computing instance by performing the security scan using a processor device and a memory device that are unavailable to the cloud computing instance.

* * * * *